No. 740,752. Patented October 6, 1903.

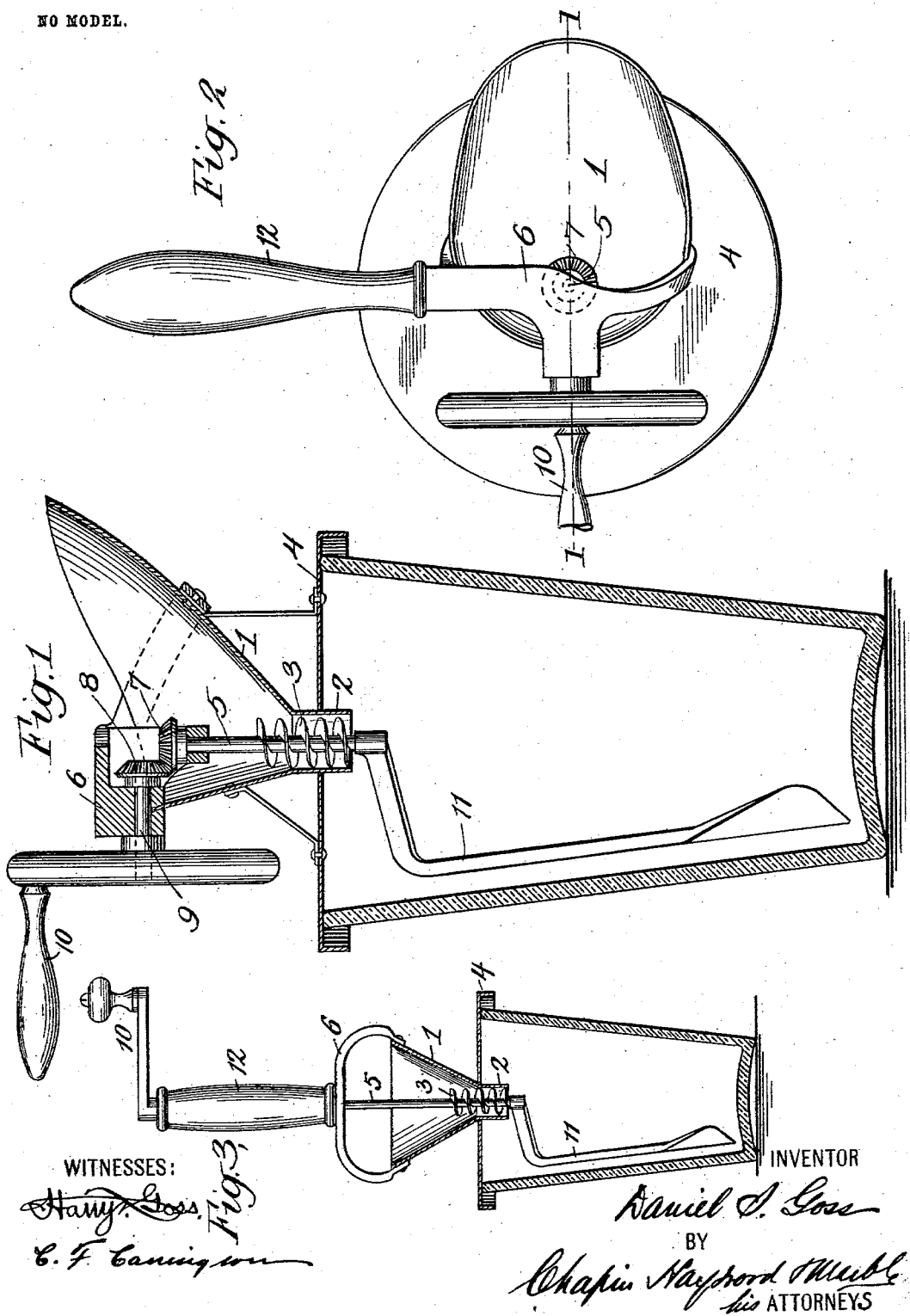

UNITED STATES PATENT OFFICE.

DANIEL S. GOSS, OF CHICAGO, ILLINOIS.

MIXING DEVICE.

SPECIFICATION forming part of Letters Patent No. 740,752, dated October 6, 1903.

Application filed February 9, 1903. Serial No. 142,529. (No model.)

*To all whom it may concern:*

Be it known that I, DANIEL S. GOSS, a citizen of the United States of America, residing at Chicago, county of Cook, State of Illinois, have invented certain new and useful Improvements in Mixing Devices, of which the following is a specification, reference being had to the accompanying drawings, forming a part thereof.

My invention relates to improvements in mixing devices, and particularly to hand-operated devices adapted for use in bar-rooms, drug-stores, restaurants, and the like for combining and mixing a granular or pulverized material—such as salts of various kinds, powders, &c.—with water or other liquid.

My invention comprises a conveyer for gradually feeding material from a receiver into a tumbler or similar drinking vessel removably arranged beneath same and means for simultaneously stirring the liquid in the said tumbler and into which the said material is being fed.

The main object of my invention is to quickly, easily, and thoroughly mix a solid and a liquid directly in the vessel from which the combined beverage is to be drunk.

I will now proceed to describe, with reference to the accompanying drawings, a device embodying my invention and will then point out the novel features in claims.

In the drawings, Figure 1 is a view in central vertical section of a mixing device constructed according to my invention, the section being taken substantially upon the plane of the line 1 1 of Fig. 2. Fig. 2 is a top view of same. Fig. 3 is a view in partial side elevation and partial central section of a mixing device constructed according to my invention, but having a slightly-different form to that shown in Figs. 1 and 2.

Referring more particularly at first to Figs. 1 and 2, the device illustrated is provided with an open-topped reservoir 1, terminating at its base in a tube or housing 2, arranged to receive a conveyer 3. The reservoir is secured to a flanged cover 4, adapted to removably engage and rest upon a tumbler or similar drinking vessel. The conveyer 3 is mounted upon a vertical shaft 5, journaled in a bearing in a fixed frame 6, secured to the reservoir. The upper end of the shaft 5 carries a miter-gear 7, which meshes with a similar miter-gear 8, carried by a horizontal shaft 9. Hand-operated means 10 are provided for rotating the shaft 9. The lower end of the shaft 5 is provided with a stirrer 11, which projects below the conveyer 3 and the flanged cover-plate 4 and is adapted to enter the drinking vessel with which the device is at that moment employed.

A handle 12 is provided by which the device may be held steadily by one hand while the hand-operated means 10 is operated by the other hand. Operation of the hand-operated means will simultaneously operate the conveyer and the stirrer.

To employ the device, a tumbler or similar drinking vessel will first be supplied with water or other liquid, and the said drinking vessel will then be arranged beneath the member 4. Material to be mixed with the liquid will be supplied to the reservoir 1, and the device will be steadied by the handle 12 or otherwise while the hand-operated means is rotated. By this means the material from the reservoir 1 will be gradually fed into the liquid in the tumbler, and the said liquid will be simultaneously stirred by the action of the stirrer 11 immersed therein. The result will be an effective, rapid, and thorough mixing of the ingredients.

In Fig. 3 I have shown a somewhat simplified form of device, in which the gearing 7 8 is eliminated and the hand-operated means 10 are secured directly to the vertical stirrer and conveyer-shaft. The handle 12 is also shown in this view as somewhat differently arranged, and it will be obvious that many modifications of the precise form, construction, and combination of parts herein shown are possible within the spirit and scope of my invention.

What I claim is—

1. In a mixing device the combination with a receiver, of a conveyer for gradually feeding material therefrom into a tumbler or similar drinking vessel removably arranged beneath same, a stirrer projecting below said conveyer and arranged to enter the said drinking vessel, and means for simultaneously operating the conveyer and the stirrer.

2. In a mixing device the combination with a receiver and a supporting member adapted to engage the rim of a tumbler or similar drinking vessel, of a conveyer for gradually feeding material from the receiver into the said drinking vessel, a stirrer projecting below said conveyer and arranged to enter the said drinking vessel, and means for simultaneously operating the conveyer and the stirrer.

3. In a mixing device the combination with a receiver and a handle therefor, of a conveyer for gradually feeding material from the receiver, into a tumbler or similar drinking vessel removably arranged beneath same, a stirrer projecting below said conveyer and arranged to enter the said drinking vessel, and means for simultaneously operating the conveyer and the stirrer.

4. In a mixing device the combination with a receiver of a conveyer for gradually feeding material therefrom into a tumbler or similar drinking vessel removably arranged beneath same, a vertical shaft for said conveyer, a stirrer secured to said vertical shaft, beneath said conveyer, and adapted and arranged to enter the said drinking vessel, and means for rotating said shaft.

5. In a mixing device, the combination with an open-topped, funnel-shaped receiver, of a conveyer for gradually feeding material therefrom into a tumbler or similar drinking vessel removably arranged beneath same, a stirrer projecting below said conveyer and arranged to enter the said drinking vessel, and means for simultaneously operating the conveyer and the stirrer.

6. In a mixing device the combination with a flanged cover adapted to rest upon the rim of a tumbler or similar drinking vessel, and an open-topped, downwardly-convergent receiver secured thereto, of a conveyer for conveying material from the receiver, into a tumbler or similar drinking vessel with which the device is at that moment engaged, a stirrer projecting below said conveyer and arranged to enter the said drinking vessel, and means for simultaneously operating the conveyer and the stirrer.

DANIEL S. GOSS.

Witnesses:
W. L. TEMPLETON,
E. L. MURFEY.